Patented Feb. 25, 1947

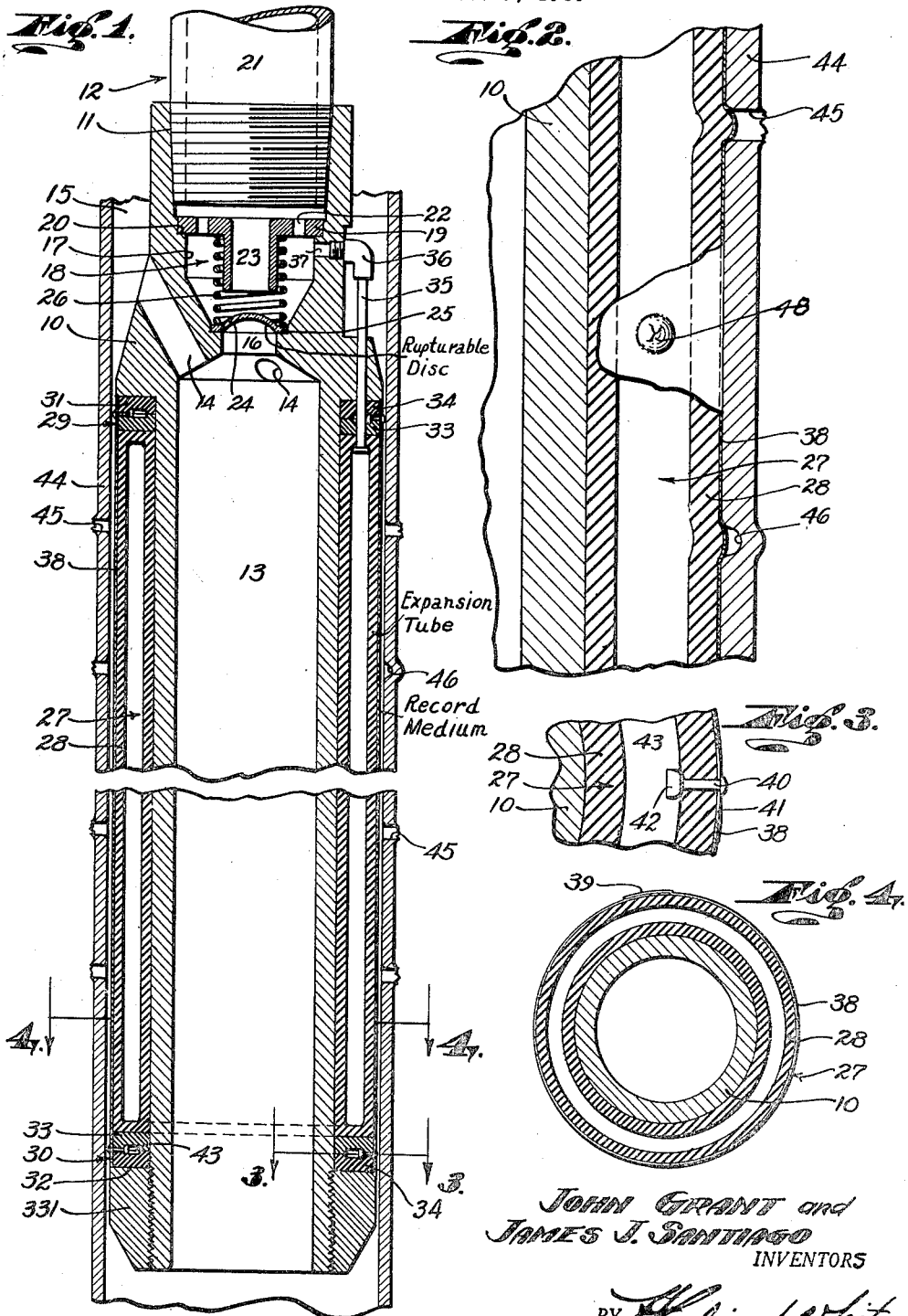

2,416,441

UNITED STATES PATENT OFFICE 2,416,441

DETERMINATION OF WELL PIPE PERFORATIONS

John Grant and James J. Santiago, Los Angeles, Calif., assignors to Grant Oil Tool Company, Los Angeles, Calif., a corporation of California Application November 3, 1944, Serial No. 561,770

12 Claims. (Cl. 73—151)

This invention has for its general purpose to provide for determination of the apertured condition of well pipe that has been opened by a gun perforator or other type of perforating tool. Particularly the invention aims to provide apparatus adapted to be lowered into the well and capable of producing a record showing the results of the perforating operation; specifically the relative locations of perforations and non-perforate indentations made by the gun or tool.

Well pipe or casing is commonly perforated by the use of a gun-type perforator which fires a plurality of projectiles against the section of the pipe to be apertured, or other types of perforators which drive a punch or cutter through the pipe. For various reasons, it may happen that all the projectiles or cutters will not penetrate or pass through the pipe at the intended locations. Consequently it becomes of importance that the actual condition of the pipe with respect to the attempted perforations, be determinable. The invention is believed to mark the first instance in which provision has been made not only for identifying existence and positions of the formed perforations, but also for producing a permanent record thereof.

In accordance with the invention, we have provided for lowering opposite the area of the pipe to be investigated, a recording or record-receiving medium adapted to be converted to a recoverable record of the pipe perforations and imperforate indentations. The invention broadly contemplates the use of any suitable recording element adapted to receive indicia of the pipe perforations and indentations, together with suitable means for controllably producing such indicia on the element.

Preferably the record forming means comprises a deformable element adapted to retain impressions of the pipe openings, and supported in a manner permitting its radial expansion by suitable means within the pipe and into its openings. Typically the recording element may be expanded against the pipe and into its perforations and indentations by hydraulically actuated means, all in a manner permitting simple operation and the application to the element of uniform pressures of the magnitude required for proper formation of the impressions. Then by release of the applied pressure, the recording element is disengageable from the perforated pipe and removable from the well to furnish an accurate and permanent record of the pipe section investigated.

All the various features and objects of the invention, together with the details of a typical and illustrative embodiment, will be explained and understood to better advantage by reference to the accompanying drawing which is described in detail in the following. In the drawing:

Fig. 1 is a vertical sectional view of the apparatus;

Fig. 2 is an enlarged fragmentary view showing the record receiving medium in expanded condition;

Fig. 3 is an enlarged fragmentary section of the apparatus taken on line 3—3 of Fig. 1; and Fig. 4 is a cross-section on line 4—4 of Fig. 1.

The apparatus is shown to comprise a tubular body 10 having a threaded connection at 11 with the lower end of the tubing or pipe 12. The body chamber 13 is in open communication through passages 14 with the space 15 above the enlarged diameter portion of the body and the later described expansion means, to provide by-passes permitting free movement of the apparatus through the well fluid. The body chamber 13 is communicable with the tubing 12 through bore 16 and the counter-bore 17 under control of suitable means, generally indicated at 18, permitting pressures inside and outside that portion of the body in constant communication with the tubing, to be equalized as the apparatus is lowered to the operating depth in the well.

Typically, the pressure equalizing control 18 is shown to comprise a tubular removable insert 19 maintained against shoulder 20 below the pipe section 21 of the coupling, the insert containing openings 22 and a central bore 23. Normally, fluid passage from the tubing into the body chamber 13 is closed off by a suitable restricting or sealing means, for example a rupturable convex disc 24 seated against shoulder 25 by coil spring 26. While the spring has sufficient expansive force normally to seat the disc, it yields in response to fluid pressure differentials above and below the disc as the apparatus is lowered through a column of well fluid, to permit the disc to unseat and pass the well fluid up into the tubing.

The expansion means, generally indicated at 27, may comprise an annular hollow rubber tube 28 confined at its upper and lower ends between expansive sealing ring assemblies 29 and 30 seating respectively against the annular body shoulder 31 and shoulder 32 formed by nut 331 threaded on the lower end of the body. Nut 331 is adjustable to vary the spacing of shoulders 31 and 32 to properly accommodate the expansion tube and sealing ring assemblies. Each of the latter is shown to consist of a pair of rubber ring segments 33 and 34 maintained together by confinement between the end of the expansion tube and shoulder 31 or 32.

The interior of the expansion tube 28 may be placed in communication with the body passage above the disc 24, in any suitable manner. Merely as illustrative, the expansion tube is shown to be connected with bore 17 by way of tube 35 extending through the upper sealing ring assembly 29 and connected by fitting 36 with passage 37.

The record-forming element preferably comprises a relatively thin deformable member 38, typically consisting of tin or alloy sufficiently thin and deformable that when displaced or expanded into or against the well pipe perforations or indentations, the sheet material will retain the impression of at least the inner edge portion of the perforation or indentation against which the sheet is expanded. As illustrated in Fig. 4, the sheet 38 extends around the expansion tube 28, with the ends of the sheet overlapped at 39 to permit radial expansion and contraction while maintaining its complete annular extent about the expansion tube. The sheet 38 may be suitably supported in a manner permitting its radial expansion and contraction, as by means of headed pins 40 extending through slots 41 in the sheet and having inner enlarged ends 42 retained within cavities or an annular recess 43 between the ring segments 33 and 34.

In considering the operation of the apparatus, assume that a section of the well pipe or casing 44 has been gun-perforated, as a result of which through perforations 45 have been formed at some locations, and imperforate indentations 46 at other locations where the projectiles have failed to penetrate the pipe. To determine the relative location and condition of the attempted perforations, the illustrated apparatus is lowered on the tubing 12 to operating position at which the record-forming element is brought opposite the perforated section to be investigated. During lowering of the apparatus, equalization of the pressure above the disc 24 with the well pressure, as previously explained, also and correspondingly equalizes the pressure inside tube 28 with the well pressure, because of the connection 35 between the tube and bore 17. Accordingly, no deformation or distortion of the recording element is permitted while the apparatus is lowered to operation position.

Thereafter, fluid pressure developed at the ground surface and communicated through the tubing and passage 35 expands the elastic tube 28 and the sheet element 38, bringing the latter into pressural engagement with the annular perforated area of the pipe, disc 24 being seated by the pressure to prevent fluid escape through the body. Axial or longitudinal expansion of the tube 28 accompanying its radial expansion, compresses the ring assemblies 29 and 30 and expands them into sufficiently tight engagement with the pipe 44 to restrain any tendency for the tube 28 to expand vertically past the sealing ring assemblies. Thus the expansive pressure is effectively applied and confined to the record-forming element 38.

The sheet 38 being deformable, the effect of the pressure applied by the rubber expansion tube is to displace the recording sheet into the perforations 45, the extent of the displacement and resultant deformation of the sheet material being predeterminable in accordance with such factors as the thickness and composition of the sheet and the maximum expanding pressure communicated to the tube. It is contemplated that the sheet 38 may be made sufficiently thin that its deformation resulting from displacement into the perforations 45 under the applied pressure, shall be such as to rupture or at least crack or split the sheet, (see the ruptured impression 48 in Fig. 2) to later indicate that the pipe contained a through perforation at the location corresponding to the location of the rupture in the recording sheet. When expanded against an imperforate indentation 46 formed by incomplete penetration of the gun projectile, the recording sheet tends to seal about the inner edge of the indentation, and as a result outward deformation of the sheet is resisted by fluid sealed within the indentation. Consequently, the sheet is deformed at the location of the indentation but without being deformed to the point of rupture.

The maximum pressure to be communicated to the sealing ring and applied to the recording sheet, is predetermined by using a disc 24 which will rupture at the desired maximum pressure. Breakage of the disc permits passage of the fluid down through the body, relieving the pressure communicated to the expansion tube. Upon thereafter equalizing the pressures inside and outside the tube, the parts contract to the position of Fig. 1, withdrawing the record sheet deformations from the perforations and indentations, so that the apparatus may be removed to the ground surface.

The record thus made and recovered is of a permanent nature in the form of a sheet carrying impressions of the contour or edges of the perforations and indentations entered by the element, and distinguishing between the perforations and imperforate indentations by the ruptured or non-ruptured condition of the impressions.

We claim:

1. Apparatus comprising deformable material capable of retaining its deformation and adapted to be lowered in a well pipe opposite a perforated area thereof, and means for radially expanding said material within the pipe and into the pipe perforations and non-perforate indentations therein to form a record of the location of said perforations and indentations.

2. Apparatus comprising deformable material adapted to be lowered in a well pipe opposite a perforated area thereof, and means for radially expanding and positively retracting said material into and out of the pipe perforations to convert said material to a record of the location thereof.

3. The combination comprising a thin deformable record-forming member adapted to be lowered in a well pipe opposite a perforated area thereof, expansion means at the inside of said member operable to press the member against said area of the pipe and into its perforations, and means for actuating said expansion means.

4. The combination comprising a thin deformable record-forming material adapted to be lowered in a well pipe opposite a perforated area thereof, expansion means at the inside of said material operable to press the material into the pipe perforations and non-perforate indentations in the pipe in a manner causing ruptured deformation of the portions of the material entering the perforations and non-ruptured deformations of the portions of the material entering said indentations, and means for actuating said expansion means.

5. The combination comprising deformable record-forming material capable of retaining its deformation and adapted to be lowered in a well pipe opposite a perforated area thereof, elastic expansion means at the inside of said material, and means for applying fluid pressure to said expansion means to press said material into the pipe perforations and imperforate indentations in the pipe to form a record thereof.

6. The combination comprising a tubular body adapted to be lowered on tubing in a well pipe opposite a perforated area thereof, elastic expansion means carried by said body, a deformable record-forming member at the outside of said expansion means, and means for communicating fluid pressure from said tubing to said expansion means to press said member into the pipe perforations and indentations to form a record thereof.

7. The combination comprising a tubular body adapted to be lowered on tubing in a well pipe opposite a perforated area thereof, elastic expansion means carried by said body, a deformable record-forming member at the outside of said expansion means, means for communicating fluid pressure from said tubing to said expansion means to press said member into the pipe perforations and indentations to form a record thereof, and means normally closing passage of fluid from the tubing through said body and adapted to pass the fluid therethrough when increased fluid pressure is communicated to said expansion means.

8. Apparatus comprising a record-forming medium, a support for said medium adapted to be lowered in a well pipe to bring said medium opposite a perforated area thereof, and means operable to press said medium against the pipe and transform the medium into impressions indicating the location of the pipe perforations in said area.

9. Apparatus comprising a substantially annular record-forming medium, a support for said medium adapted to be lowered in a well pipe to bring said medium opposite a perforated area thereof, and means operable to press said medium against the pipe and transform the medium into impressions indicating the location of the pipe perforations in said area.

10. Apparatus comprising a substantially annular record-forming medium, a support for said medium adapted to be lowered in a well pipe to bring said medium opposite a perforated area thereof, and means operable to expand said medium radially in all directions within the pipe against said area and to thereby convert said medium to a record of the location of the pipe perforations in said area.

11. Apparatus comprising deformable material capable of retaining its deformation and adapted to be lowered in a well pipe opposite a perforated area thereof, and a capsule at the inside of said material and expansible by fluid pressure to radially press said material against the pipe and into the pipe perforations to form a record of the location of said perforations.

12. The combination comprising a thin metallic deformable record-forming member in sheet form capable of retaining its deformation and adapted to be lowered in a well pipe opposite a perforated area thereof, an annular rubber capsule at the inside of said member, and means for communicating fluid pressure to said capsule to expand said member radially in all directions and into the pipe perforations to form a record thereof.

JOHN GRANT.
JAMES J. SANTIAGO.

REFERENCES CITED

The following references are of record in the file of this patent:

UNITED STATES PATENTS

| Number | Name | Date |
|---|---|---|
| 1,861,999 | Bowlus | June 7, 1932 |
| 2,184,689 | Savitz | Dec. 26, 1939 |
| 2,201,096 | Kerman | May 14, 1940 |
| 2,270,505 | Burleson | Jan. 20, 1942 |
| 2,277,898 | Andrew | Mar. 31, 1942 |
| 2,281,960 | Vacqnier | May 5, 1942 |
| 2,348,192 | Chambers | May 9, 1944 |
| 2,000,527 | Linderman, Jr. | May 7, 1935 |
| 2,153,917 | Exline | Apr. 11, 1939 |